Oct. 29, 1946.     E. J. BRETON ET AL     2,410,043
PROCESS FOR MANUFACTURING CALCIUM FLUORIDE
Filed Jan. 4, 1945
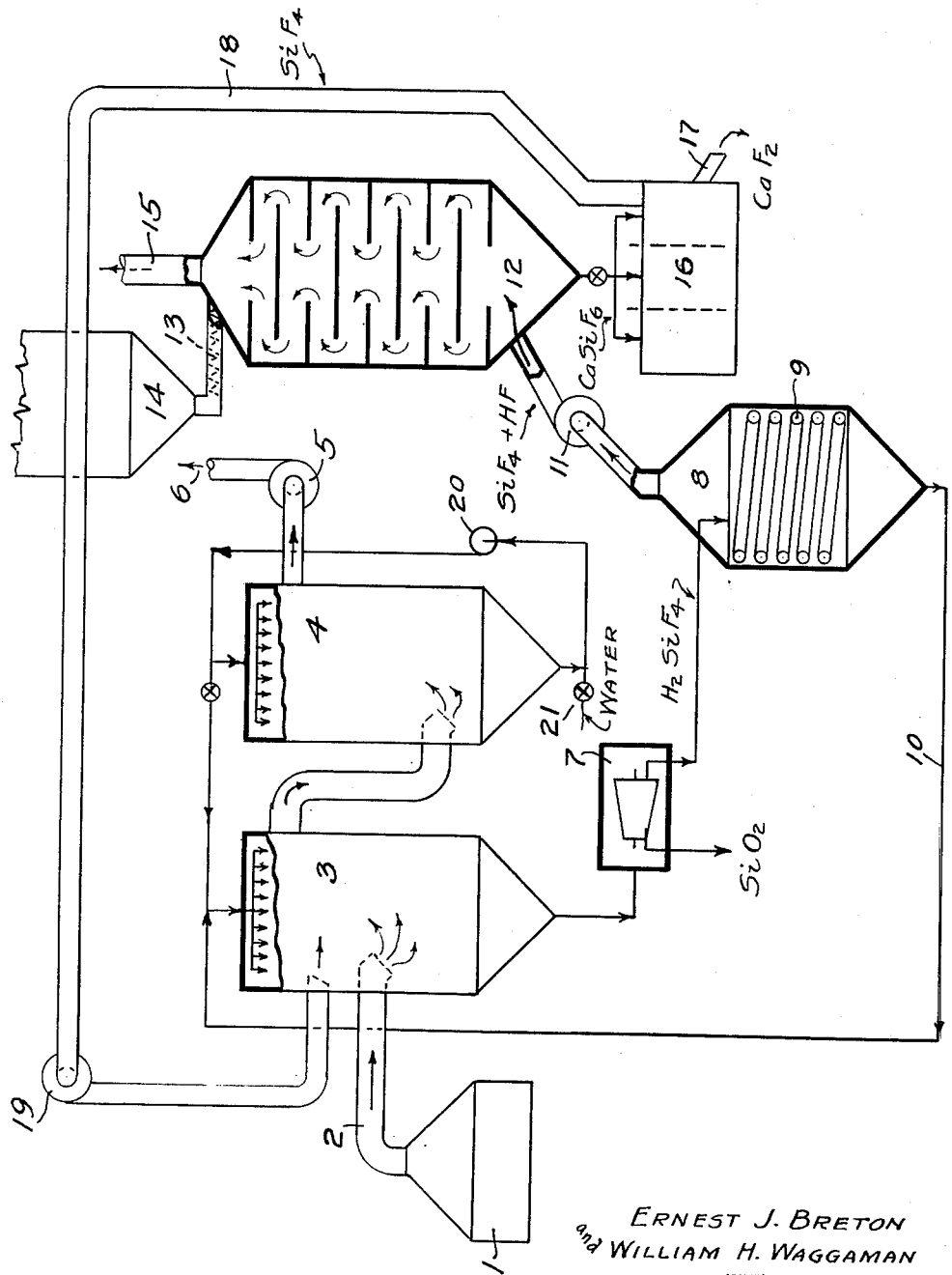
Ernest J. Breton
and William H. Waggaman
INVENTORS
BY J. F. Morehead
ATTORNEY Patented Oct. 29, 1946

2,410,043

UNITED STATES PATENT OFFICE 2,410,043

PROCESS FOR MANUFACTURING CALCIUM FLUORIDE

Ernest J. Breton, Arlington, and William H. Waggaman, Alexandria, Va., assignors to the United States of America, as represented by the Secretary of the Interior Application January 4, 1945, Serial No. 571,344

1 Claim. (Cl. 23—88)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the Act of April 30, 1928 (Ch. 460, 45 Stat. L. 467).

The primary object of this process is to produce relatively pure calcium fluoride from the gases evolved in certain manufacturing processes. A further object is to obtain a flux to be used in the basic open hearth furnace in lieu of fluorspar in order to slag off impurities and obtain steel of certain desired quality. Still another object is to recover in the form of marketable products, fluorine which is being lost or wasted in the manufacture of fertilizers.

The known deposits of fluorspar suitable for use as a fluxing agent in the manufacture of open hearth steel are limited and hence difficulty has been encountered in obtaining adequate quantities to take care of the demand. At the present time the specifications for metallurgical fluorspar call for a product containing 85% of $CaF_2$ and, while lower grade ores might be added directly to the furnace charge, it is customary to beneficiate such ores as far as possible in order to avoid the necessity of adding further quantities of limestone or other fluxes which increases the volume of slag to be handled and the quantity of fuel required to flux it.

It is a well known fact that much fluorine is evolved in the treatment of phosphate rock to produce fertilizer and stock feed, but up to the present time only a small proportion has been collected and utilized. For instance, when phosphate rock is calcined at high temperatures in the presence of water vapor, the bulk of the fluorine is evolved and the resultant defluorinated product is suitable for use as either fertilizer or stock feed. Again, large quantities of fluorine are annually lost in the manufacture of superphosphate, a product which is the basis of the fertilizer industry.

When phosphate rock containing both fluorine and silica is treated with sulphuric acid the reactions taking place (as far as the fluorine compound is concerned) may be represented by the three following equations:

(1)  $H_2SO_4 + CaF_2 = CaSO_4 + 2HF$ (2)  $4HF + SiO_2 = SiF_4 + 2H_2O$ (3)  $3SiF_4 + 2H_2O = 2H_2SiF_6 + SiO_2$

The usual method of recovering the fluorine evolved in this process is to absorb the gases in water, thus producing a dilute solution of hydrofluosilicic acid and precipitating gelatinous silica as shown in Equation 3. The acid solution is then decanted off and treated with sodium chloride to precipitate sodium fluosilicate as shown in Equation 4.

(4)  $H_2SiF_6 + 2NaCl = Na_2SiF_6 + 2HCl$

If it is desired to produce calcium fluosilicate, calcium chloride may be substituted for sodium chloride.

Calcium fluosilicate, however, is not as suitable for certain industrial uses as calcium fluoride. Therefore a simple process whereby the former can be converted into the latter compound without loss of fluorine is highly desirable.

We have developed such a process for the production of calcium fluoride from the gases evolved in the decomposition of materials containing both fluorine and silica.

Briefly this process consists in first producing a solution of hydrofluosilicic acid, the concentration of which is built up by recirculating it in a scrubber into which the fluorine gases are introduced. This acid solution after being filtered free of precipitated silica is discharged into a chamber where it is heated to evolve both hydrofluoric acid and silicon tetrafluoride. These gases are then led into a reaction chamber containing lime wherein relatively dry calcium fluosilicate is formed according to Equation 5.

(5)  $SiF_4 + 2HF + CaO = CaSiF_6 + H_2O$

The calcium fluosilicate is then discharged into an electric or other suitable furnace and heated to at least 1300° C., resulting in the formation of molten calcium fluoride and the evolution of silicon tetrafluoride. The former is tapped off, cooled, and broken up to be marketed, while the latter is re-introduced into the system. This reaction is shown in Equation 6:

(6)  $CaSiF_6 + heat = CaF_2 + SiF_4$

While we do not wish to limit ourselves to a specific assembly, the apparatus shown diagrammatically in the accompanying drawing serves to illustrate the various steps of this process and a suitable type of plant in which the process may be carried out.

Referring to Figure 1, finely ground phosphate rock and sulphuric acid are mixed in a mixer 1 of conventional design to produce ordinary superphosphate. The fluorine gases evolved from this mixer 1 are drawn through the flue 2 by means of the fan 5 into the absorption chamber 3 which is fed with a recirculated solution of hydrofluosilicic acid. Any gaseous fluorine compounds not absorbed in this chamber pass into a second absorption chamber 4 of similar design where they are removed before discharging the spent gases to the atmosphere through the vent 6. In order to compensate for the water lost through silica rejection and evaporation in the primary absorption system, a portion of the solution in the secondary absorption chamber 4 is constantly injected into absorption chamber 5 by means of the pump 20. An equivalent volume of water is added to chamber 4 through the valve 21 to maintain the efficiency of this secondary absorption unit and keep the system in balance.

The solution of hydrofluosilicic acid, containing silica in suspension, flows from the absorption chamber 3 into the continuous filter or centrifuge 7 where the silica is separated. The clear acid solution then flows into the evaporator 8 heated by means of the stem coils 9 and the liquid effluent is continuously recirculated through the absorption chamber 3 by means of the pump 10.

The gases evolved in the evaporator 8 are drawn by means of the fan 11 into the reaction chamber 12 similar to the well known Herreshoff multiple hearth furnace, and fitted with evolving arms which rake the lime introduced by means of the conveyor 13 from the hopper 14 exposing said lime to the action of the fluorine gases flowing counter-current thereto. The spent gases, free from fluorine are discharged through the vent 15.

The calcium fluosilicate formed in the reaction chamber is discharged into the furnace 16 maintained at a temperature of at least 1300° C. where it is converted into molten calcium fluoride which is drawn off periodically through the tap hole 17.

The gases evolved from this furnace consisting largely of silicon tetrafluoride are conducted through the flue 18 and reintroduced into the absorption chamber 3 by means of the fan 19.

It will be apparent that we have provided a practical way to make calcium fluoride from sources of fluorine which are now completely wasted. However, various changes may be made in the invention as described without departing from the spirit and scope thereof.

We claim:

A cyclic process for producing calcium fluoride consisting in absorbing gases containing silicon tetrafluoride in water to produce hydrofluosilicic acid and silica; separating the acid solution from silica; continuously evolving gaseous fluorine compounds from said solution by means of heat and evaporation; recirculating the solution thus partially freed from fluorine in order to absorb additional quantities of silicon tetrafluoride; contacting the gases evolved from the heated solution with lime to form calcium fluosilicate; decomposing said calcium fluosilicate at elevated temperatures to produce molten calcium fluoride and silicon tetrafluoride; and reintroducing the evolved silicon tetrafluoride into the absorption stage to produce further quantities of calcium fluoride.

WILLIAM H. WAGGAMAN.
ERNEST J. BRETON.